April 15, 1930. P. L. LOBEZ 1,754,236
PISTON PACKING
Filed Dec. 12, 1928
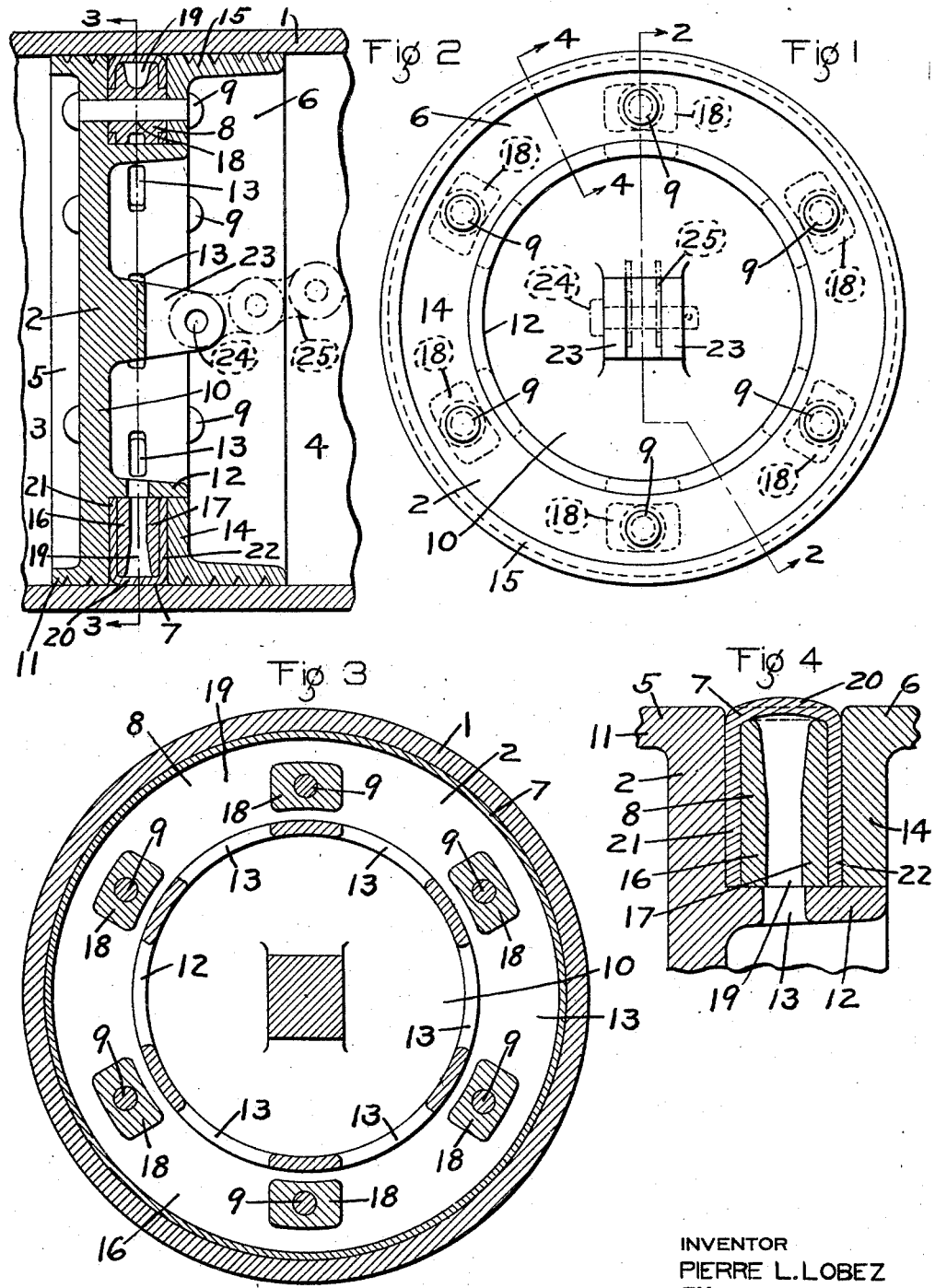
INVENTOR
PIERRE L. LOBEZ
BY
Wm. M. Cody
ATTORNEY

Patented Apr. 15, 1930

1,754,236

UNITED STATES PATENT OFFICE

PIERRE L. LOBEZ, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA

PISTON PACKING

Application filed December 12, 1928. Serial No. 325,463.

This invention relates to vacuum brakes and more particularly to vacuum brakes for automotive vehicles.

The principal object of my invention is to provide an improved piston for vacuum brakes, which when mounted in a brake cylinder, will prevent fluid at atmospheric pressure on one side of the piston from leaking past the piston into the vacuum chamber at the other side of the piston.

Another object of my invention is to provide a piston packing for vacuum brakes which is maintained in sealing engagement with the inner wall of the brake cylinder by fluid at atmospheric pressure.

Other objects and advantages will appear in the following more detailed description of the invention.

In the accompanying drawing: Figure 1 is an end elevational view of a piston constructed in accordance with the invention; Fig. 2 is a sectional view of the same taken on the line 2—2 of Fig. 1, a portion of the brake cylinder being shown in section; Fig. 3 is a sectional view taken on the line 3—3 of Fig. 2; and Fig. 4 is an enlarged sectional view of a fragment of the piston taken on the line 4—4 of Fig. 1.

The invention as illustrated in the drawing may be used in automotive vacuum brakes of the type disclosed in the pending application of Albert Dewandre, Serial No. 56,320, filed September 14, 1925, and may comprise a brake cylinder 1, only a portion of which is shown, containing a piston 2. Opposite sides of this piston are normally subject to atmospheric pressure and the brakes are applied upon the connection of a chamber 3 at one side of the piston with a partial vacuum source, such as the suction intake of an internal combustion engine (not shown). A chamber 4 at the other side of the piston is open to the atmosphere.

The piston 2 comprises parts 5 and 6 between which are clamped a packing 7 and an annular spacing member 8, the parts being secured together by rivets 9 or any other desired means.

The part 5 comprises a circular web 10 having an integral rearwardly extending peripheral skirt 11 which is adapted to fit in the brake cylinder 1. Projecting forwardly from the web 10 and having a diameter which is considerably less than that of the skirt 11, is an annular flange 12 having openings 13 formed therein, and it is upon this flange that the spacing member 8 and part 6 is mounted. The part 6 of the piston comprises a clamping flange 14 having a rearwardly extending peripheral skirt 15, which, like the skirt 11, is adapted to fit in the brake cylinder 1.

The spacing member 8 comprises spaced annular plates or sides 16 and 17 which are connected together at intervals by cross pieces 18 in such a manner that there is a clear air space 19 between the sides, which air space extends entirely around the member. The openings 13 in the flange 12 lead to the air space 19.

The packing 7 may be made from leather or any other suitable material and is preferably of U-shape in cross section having a web 20 which extends across the outer edges of the sides 16 and 17 of the member 8 and inturned flanges 21 and 22. The flange 21 is clamped between the web 10 of the part 5 and the side 16 of the member 8 and flange 22 is clamped between the side 17 of the member 8 and the clamping flange 14 of the part 6 and the web 20 is adapted to contact, throughout its circumference, with the inner wall of the brake cylinder 1.

As shown in Fig. 4 of the drawing the web 20 of the packing is initially bowed outwardly so that when the piston is mounted in the brake cylinder the web will not be drawn taut across the air space between the sides 21 and 22 of the spacing member 8 but will have a slight amount of slack.

It will here be noted that should the partial vacuum created in the chamber 3, cause a partial vacuum to be created in the vicinity of the packing, fluid at atmospheric pressure in the air space 19 acting upon the inner surface of the web 20 of the packing will force the web 6 into closer contact with the inner wall of the brake cylinder 1, thus preventing the leakage of fluid past the packing into the chamber 3.

Extending outwardly from the atmospheric pressure side of the part 5 of the piston are spaced lugs 23 to which one end of a flexible connection 25 is attached by a pin 24, the other end of the connection being attached to the usual brake applying means, (not shown).

While one illustrative embodiment of the invention has been described in detail, it is not my intention to limit its scope to that embodiment or otherwise than by the terms of the appended claim.

Having now described my invention, what I claim as new and desire to secure by Letters Patent, is:—

The combination with a brake cylinder, of a piston comprising a part having a web, an annular flange projecting from one side of said web and having openings formed therein, an annular clamping part carried by said flange, an annular spacing member carried by said flange and having spaced sides, the space between said sides being open to atmosphere through the openings in said flange, and packing clamped between said spacing member, web, and clamping member and being subject to atmospheric pressure in said spacing member to cause said packing to expand into close engagement with the inner wall of said brake cylinder when a partial vacuum is created at one side of said piston.

In testimony whereof I have hereunto set my hand, this 10th day of December, 1928.

PIERRE L. LOBEZ.